United States Patent [19]
Gaa et al.

[11] Patent Number: 4,810,576
[45] Date of Patent: Mar. 7, 1989

[54] TREATED GLASS FIBERS AND AQUEOUS DISPERSION AND NONWOVEN MAT OF THE GLASS FIBERS

[75] Inventors: Peter C. Gaa, Pittsburgh, Pa.; Jerry C. Hedden, Shelby; Donald L. Motsinger, Forest City, both of N.C.; H. Kenyon Watkins, Pittsburgh, Pa.

[73] Assignee: PPG Industries, Inc., Pittsburgh, Pa.

[21] Appl. No.: 80,040

[22] Filed: Jul. 31, 1987

Related U.S. Application Data

[63] Continuation-in-part of Ser. No. 781,178, Sep. 30, 1985, abandoned.

[51] Int. Cl.$^4$ .......................... B32B 9/00; D02G 3/00
[52] U.S. Cl. .................................... 428/391; 428/375; 428/378; 428/392; 428/394; 428/395
[58] Field of Search ............... 428/375, 394, 395, 391, 428/392, 378

[56] References Cited

U.S. PATENT DOCUMENTS

| | | | |
|---|---|---|---|
| 4,179,331 | 12/1979 | Chakrabarti | 162/156 |
| 4,185,138 | 1/1980 | Graham | 428/378 |
| 4,265,704 | 5/1981 | Nahta | 162/156 |
| 4,395,306 | 7/1983 | Killat | 162/156 |
| 4,457,785 | 7/1984 | Hsu et al. | 106/308 |
| 4,461,804 | 7/1984 | Motsinger et al. | 428/391 |

OTHER PUBLICATIONS

Smith, K. L., et al., "High Molecular Weight Polymers of Ethylene Oxide", Industrial and Eng. Chem., vol. 50, pp. 12-16, 1958.
"Polyox Water-Soluble Resins are Unique", Technical Brochure.

*Primary Examiner*—Sharon A. Gibson
*Attorney, Agent, or Firm*—Kenneth J. Stachel

[57] ABSTRACT

Chemically treated glass fibers of the present invention perform well as wet chopped strands of glass fibers and are useful in producing glass fiber paper. In one aspect the chopped strands of glass fibers have an aqueous chemical treatment comprised of at least one water soluble, ungelled polymer having an effective viscosity, an effective film-forming capability and an effective molecular weight. In another aspect the chemically treated glass fibers have a chemical treating composition having a polyoxyethylene polymer as the water soluble and ungelled polymer with an effective film forming molecular weight along with water soluble, dispersible or emulsifiable aldehyde-condensate-reactable, polymeric agent, cationic lubricant or lubricating surfactant, aldehyde-condensate-reactable organo silane coupling agents and a carrier like water. The amount of the reactable polymeric agent is an effective white water compatible amount, where this agent is a polymer like either polyacrylamide or polyamide or a mixture of these. The aldehyde-condensate-reactable organo silane coupling agent can be an alkoxylated gamma aminoalkyltrialkoxy silane, a polyamino organo silane, mercapto functional organo silane or a ureido functional organo silane or a mixture thereof.

19 Claims, No Drawings

TREATED GLASS FIBERS AND AQUEOUS DISPERSION AND NONWOVEN MAT OF THE GLASS FIBERS

This application is a continuation-in-part application of patent application Ser. No. 781,178, filed Sept. 30, 1985, now abandoned.

The present invention is directed to treated glass fibers having good processibility into chopped glass fibers and facile dispersibility in aqueous solution, and producability into glass fiber-containing paper having good strength properties.

The production of glass fibers from molten glass involves attenuating fibers from small orifices in a bushing in a glass melting furnace. The glass fibers usually are attenuated by a mechanical means and are usually gathered into one or more strands and are either collected as continuous strands on a winder or are chopped and collected as wet chopped glass fiber strands. During the attenuation and before the numerous glass fibers are gathered into one or more strands, a treating composition, which is known as a sizing composition, is applied to each of the glass fibers. The aqueous sizing composition is necessary to provide protection to the glass fibers from interfilament abrasion, especially when the fibers are gathered together as strands. Also the sizing composition can be used to promote compatibility between the glass fibers and any matrix in which the glass fibers are to be used for reinforcement purposes. The collected continuous strands, or chopped strands can be dried, or wet chopped strands can be dried and packaged or they can be packaged in their wet condition. The dried continuous glass fiber strands can be chopped or combined with other glass fiber strands to form rovings, or produced into continuous strand mats or woven. Such steps depend upon the ultimate use for the glass fibers.

Glass fibers have been used by themselves and in combination with other types of fibers in the production of paper-like sheet materials and as chopped, continuous fibers, and strands and mats and fabrics for reinforcing polymers. Preparing chopped strand with a plurality of fibers involves chopping the strand with an attempt to chop each and every fiber in the strand. Chopped and continuous glass fibers have been used as such a supplemental fiber in specialty, synthetic, fiberboard, pulp and composite papers. Also, the glass fibers are finding a use in glass fiber paper which is a substitute for papers made of asbestos fiber. Also, in recent years, a nonwoven, sheet-like mat of chopped glass fibers and/or strands has been utilized increasingly as a replacement for organic felts such as cellulose mats in roofing shingles and built-up roofing systems (BUR systems). This usage and further expanded usage of the glass fiber mats in the roofing industry is based on several advantages of the glass fiber mat. These advantages include: the reduction in the amount of asphalt necessary for the roofing products, the reduction in weight of the roofing products, increased production rates for producing the roofing products, superior rot resistance, longer product life, and improved fire ratings. These types of papers and nonwoven, sheet-like mat are usually produced in a process where chopped fibers, or chopped fiber strands are dispersed in an aqueous solution and formed into a mat of chopped glass fibers and/or strands. A nonwoven, sheet-like mat product is produced by contacting the mat of glass fibers with a polymeric binder. An example of a process to produce such a mat is the "wet-laid" process.

The wet-laid process involves forming an aqueous dispersion of chopped fibers or chopped strands usually with agitation in a mixing tank. The aqueous dispersion, usually referred to as slush, is processed into the wet-laid, sheet-like mat by such machines as cylinder or fourdrinier machines or more technologically advanced machinery, such as the Stevens Former, Roto Former, Inver Former and the VertiFormer machines. The slush is deposited from a head box onto a moving wire screen or onto the surface of a moving wire-covered cylinder. The slurry on the screen or cylinder is processed into the nonwoven, sheet-like mat by the removal of water, usually by a suction and/or vacuum device, and by the application of a polymeric binder. Water and excess binder are removed by suction and/or vacuum devices. The binder impregnated nonwoven, sheet-like glass fiber mat is dried and cured in one or more ovens.

The strength of the nonwoven, sheet-like mat of glass fibers must be sufficient to withstand the processing steps and speeds to produce the nonwoven, sheet-like mat for application in various end uses. In addition, the finish on the glass fibers and the strength of the sheet-like mat must be sufficient to permit the mat to be stored in any desirable form, possibly for an extended period of time without loss of its cohesive properties. Also, the finish on the glass fibers in the sheet-like mat should enable the stored mat to be processed into end use applications without cracking or without the production of large amounts of static being generated during use. The efficient processability of the nonwoven, sheet-like mat into various end use applications depends on the strength properties of the sheet-like mat and also the structure and homogeneity or uniformity of the arrangement of the glass fibers in the mat itself.

Also, the strength of the sheet-like mat is important for the strength that the mat gives to any end use product incorporating the mat. For example, when the sheet-like mat of chopped glass fibers and/or strands is to be utilized in producing roofing products, such as shingles, and the mat for BUR systems, the sheet-like mat must have sufficient strength properties to enable the processing of the sheet-like mat into these products. The roofing industry is seeking higher strengths for these products, and this is especially true for dry tensile and tear strengths of the sheet-like mat.

The uniformity of the arrangement of chopped glass fibers and/or strands in the nonwoven, sheet-like mat of chopped glass fibers and/or strands contributes to the strength of the mat and to the ultimate end product. One problem that exists in preparing a uniform mat of chopped glass fibers and/or strands from an aqueous dispersion is that glass fibers are not easily dispersed in aqueous media. This difficulty in dispersing the glass fibers occurs initially upon adding the glass fibers to water. The dispersibility is further complicated by the tendency of the glass fibers that are scattered somewhat in the aqueous medium, to reagglomerate to some degree. The reagglomerated glass fibers are very difficult to redisperse. The lack of a good dispersion of the glass fibers in the aqueous medium hampers the formation of a uniform mat, and adversely affects the strengths of the resultant sheet-like mat or end product incorporating the mat.

Recent glass fiber products marketed by PPG Industries, Inc., for producing mats of chopped glass fibers from a slush or slurry have had excellent dispersibility and they have performed well in the previous glass paper manufacturing processes. Our research has continued in this field to develop even better glass fiber products. The glass paper-making industry strives for processes with faster line speeds which necessitate higher drying temperatures for lower weights of the chopped glass fiber mats, and for higher tensile strengths in the paper product.

It is an object of the present invention to provide chemically treated glass fibers that are adequately protected from interfilament abrasion, where the fibers are in the form of improved choppable bundles of fibers, and at the same time, provide chemically treated glass fibers that have good dispersibility and that have good retention of the chemical treating composition in the aqueous medium, and that are useful in forming aqueous dispersions of chopped glass fibers and/or strands that can be produced into non-woven, sheet-like mat having good strength properties.

It is a further object of the present invention to have nonwoven, sheet-like mats having one or more polymeric binders having good strength properties, such as good wet-strength properties, dry-strength properties, and/or tear-strength properties to allow for good processability of the mats themselves, and of the mats into resulting products, such as base materials for roofing products like BUR systems, shingles, and flooring.

SUMMARY OF THE INVENTION

Accordingly, the foregoing objects and other objects gleaned from the following disclosure are accomplished by the present invention.

According to a first aspect of the present invention, one or more strands of glass fibers treated with an aqueous chemical composition have improved integrity in a wet condition for improved choppability. The aqueous chemical treating composition has at least one water-soluble, ungelled polymer having an effective viscosity to result in a viscosity for the aqueous chemical treating composition of at least 5 centipoise. Also, the ungelled polymer has a capability of forming a film at a temperature below ambient temperature and has an effective molecular weight of at least 100,000 and up to 6,000,000. Water is also present in the composition in an effective amount to allow for the viscosity of the aqueous chemical treating composition of at least 5 centipoise. The application of the aqueous chemical treating composition to the glass fibers is by any known method such as spraying, dipping, application by rollers and the like. Accomplishing the determination of the viscosity is by any method known to those skilled in the art. For instance, the determination of the viscosity for at least 5 centipoise is by a Brookfield viscometer with a number 1 spindle at an rpm of 30, but other equivalent determination methods are useable.

Another aspect of the present invention involves glass fibers having an aqueous chemical treating composition applied to the glass fibers in any manner, where the composition has as the water soluble, ungelled polymer, one or more water soluble, polyoxyethylene polymers having an effective film forming molecular weight. In addition the composition has present: one or more water soluble, dispersible, and/or emulsifiable cationic lubricants; water soluble, emulsifiable or dispersible aldehyde-condensate-reactable, polymeric agent; one or more aldehyde-condensate-reactable coupling agents and a carrier. The lubricant has one or more primary, secondary, and/or tertiary amines. The aldehyde-condensate-reactable polymeric agent can be polymers such as polyacrylamide and polyamide polymers and mixtures thereof in effective white water compatible amounts. The one or more aldehyde-condensate-reactable coupling agents have an organic and an inorganic polar functional moiety, and they can be coupling agents like alkoxylated amino organosilanes, polyaminorganosilanes, mercapto-organo silanes and ureido organo silanes. Both the polymeric agent and the coupling agent that are reactable with the aldehyde-condensate are capable of reacting with each other and the aldehyde-condensate in the presence of the aldehyde-condensate. The carrier, e.g. water, is present in sufficient amounts to enable the treating composition to contact and coat the glass fibers.

The treated glass fibers can have an amount of the ungelled polymer or of the treating composition with the ungelled polymer in the range of about 0.01 to about 1.5 or more weight percent on a loss on ignition (LOI) basis. The treated fibers are in the form of bundles and/or strands. The treated glass fibers can be in any form such as continuous glass fiber strands or chopped glass fiber strands, which are produced as wet chopped or dry chopped glass fiber strands. When the chopped treated glass fiber strands are dispersed in aqueous media, the use of dispersing agents is not needed in the aqueous media. However, if desired, these agents can be used since the treated glass fibers do not interfere with the function of the dispersing agents.

A further additional aspect of the present invention is a method of producing an aqueous dispersion of chopped treated glass fibers and/or strands. Also a further aspect is a nonwoven, sheet-like, glass fiber-containing mat produced from such a dispersion by the removal of some water from the aqueous dispersion that is present on a wire screen or cylinder. The glass fiber-containing mat is contacted with the one or more aldehyde-condensate polymeric binders to produce the nonwoven, sheet-like mat having good strength properties such as wet and dry tensile strength and tear strength to be useful as a base or supporting layer in roofing products and flooring products and other products, where a good strength mat is required along with a Class A fire rating and good rot resistance.

DETAILED DESCRIPTION OF THE INVENTION

It is believed, but the present invention is not limited by this belief, that the improved choppability of the strands of glass fibers having the aqueous chemical treating composition involved in the present invention occurs by the water soluble, ungelled polymer providing a sufficient viscosity to the aqueous chemical treating composition to give integrity to the fibers in the strand. This integrity enables the chopping of the strands to produce crisply chopped strands where most if not all of the fibers in the strand are adequately chopped when the strand is chopped. This integrity is supplied to the strand when it is in the wet condition. This means the aqueous chemical treating composition is on a substantial portion of the glass fiber in the strand before the glass fiber strand is heated to dry the aqueous chemical treating composition to a dried residue through evaporation of volatiles.

The properly formulated treating composition of the present invention can provide good protective properties for the glass fibers, when they are gathered into strands for continuous glass fiber strands, or when they are in the form of chopped glass fibers and/or strands. Hereinafter, in the specification and Claims, both fibers and strands will be referred to collectively as fibers. The chopped treated glass fibers of the present invention can be dispersed in aqueous media or white water systems to result in good dispersibility even in the absence of a dispersing agent. In making and using a nonwoven, sheet-like mat of the glass fibers, good strength properties are required for the processability of the mat into end use products such as shingles and other roofing products or flooring products. Certain properties for these ultimate products are necessary. These properties include one or more of the following: good tear strength, good flexibility and good wet, dry and hot-wet tensile strengths.

It has been discovered that a majority, if not all, of these properties can have good values with the use of the treated glass fibers, aqueous dispersion and glass fiber-containing, nonwoven, sheet-like mat of the present invention. The achievement of obtaining good properties in these areas is effected by the synergistic influence of the chemical components making up the treating composition on the glass fibers, the interrelationship between the chemical treating composition and the surface of the glass fibers, and the interrelationship between the treatment on the glass fiber surface and the polymeric binder used to make the nonwoven sheet-like mat.

In the specification and in the Claims, the below defined terms have the following meanings.

The "effective film forming molecular weight" of the water-soluble, ungelled polymer is that molecular weight that enables the polymer by itself to form a solid or liquid, coalesced and integrated film, that maintains the form as an integral and at least near continuous film on curved surfaces such as fibers.

The term "waxy substance" includes waxes and polyethylene, an example of which is an oil-in-water emulsion of polyethylene. These materials are more fully described in U.S. Pat. No. 4,394,418 (Temple) hereby incorporated herein.

The "white water system" is an aqueous solution in which the glass fibers are dispersed and which can contain numerous dispersants, thickeners, softening or hardening chemicals. Examples of various white water systems include aqueous solutions having polyacrylamide polymers such as the Separan polymer available from Dow Chemical Company, alone or with hydroxyethyl cellulose and the like suspending aids to provide a highly viscous aqueous solution at high material concentrations. Also, white water systems include those having any of the numerous amine oxide surfactants as shown in U.S. Pat. No. 4,179,331. An example of the polyacrylamides are those shown in U.S. Pat. No. 4,395,306. In addition to such chemicals as polyacrylamides or amine oxides being present in the white water system, there can also be present small amounts of surfactants such as polyethoxylated derivatives of amide condensation products of fatty acids and polyethylene polyamines as is shown in U.S. Pat. No. 4,265,704. Also numerous other chemical agents can be added to a white water system as is known by those skilled in the art.

The "effective white water compatible amount" is that amount which results in an amount of an aldehyde-condensate-reactable polymeric agent on the glass fibers, which when combined with the amount of an aldehyde-condensate-reactable, polymeric agent in the white water system, gives a total amount of one particular aldehyde-condensate-reactable agent so that the amount does not detrimentally affect the tensile strength of the final glass fiber paper product.

The water-soluble, ungelled polymer present on the glass fibers is water soluble, dispersible or emulsifiable and has an effective film forming molecular weight of at least 100,000 Mv measured by the viscosity of an aqueous solution by any method known in the art. The upper limit of the molecular weight for the polymer is a practical limitation regarding the solubility, dispersibility or emulsifiability in aqueous solutions and the diameter of glass fiber to which it is applied and the ability to apply the polymer to the glass fibers. Preferably, the molecular weight ranges from around 200,000 to about 6,000,000 and most preferably from 600,000 to 4,000,000 Mw and where a most suitable example is around 900,000 Mw. The upper limit of the molecular weight has a practical limitation due to the increase in viscosity of the aqueous chemical treating composition resulting from the use of higher molecular weight polymers. In treating glass fibers during their formation with the aqueous chemical treating composition, the aqueous chemical treating composition has a viscosity in the range of greater than 5 up to around 150 centipoise at room temperature. When finer fibers are treated with the aqueous chemical composition having the water-soluble ungelled polymer, the viscosity of the composition should be lower. The glass transition temperature of the polymer can be less than about $-20°$ C., for example around $-50°$ to $-70°$ C. for polyoxyethylene polymer having molecular weights exceeding 100,000. When the molecular weight of the polyoxyethylene polymer is less than around 100,000 Mv and it is used in an aqueous chemical treating composition, additional components should be added to the aqueous chemical treating composition. These components would produce a coalesced and integral film from the aqueous chemical treating composition upon moisture reduction and would reduce any plasticizing effect from the other components in the composition. Any additional component known to those skilled in the art for accomplishing these purposes can be used. It is preferred for obtaining the better integrity of the strand in the wet state for wet chopping that the Tg (glass transition temperature) is equal to or greater than ambient temperature. Also, it is preferred that the polymer is capable of forming a film at a temperature below ambient temperature. This characteristic is determined by the test for "Minimum Film Formation Temperature of Emulsion Vehicles" which is the test from the American Society of Testing Materials (ASTM) No. 2358-68.

Non-exclusive examples of the water-soluble, ungelled polymer include the polyoxyethylene polymer, as aforementioned, and includes the polymers having Tg's as determined by nuclear magnetic resonance (NMR), or any relative Tg determination method at or above ambient temperature, such as polyacrylic acid neutralized with base, polyacrylamides, polyvinylpyrolidone, and polyvinyl alcohol, and blends and mixtures thereof. These latter materials preferably have effective molecular weights of 1,000,000 or greater. The polyacrylic acid has its functional groups neutralized with ammonium hydroxide. The ammonium hydroxide is present in the aqueous chemical treating composition in an amount of around 0.1 to 0.5 weight percent. The amount of the water-soluble ungelled polymer present in the aqueous chemical treating composition generally ranges from about 0.5 weight percent of the non-aqueous component up to greater than 30 weight percent. These higher Tg polymers can be used in combination with other additives, such as at least one or more organofunctional silane coupling agent, at least one additional film forming polymer and at least one fiber lubricant. Other components that can be present are waxy substances and the polyoxyethylene. When using a lower Tg water-soluble, ungelled polymer, there is preferably used in conjuction with it a higher Tg water-soluble, ungelled polymer or the low Tg polymer has a very high effective molecular weight.

A suitable polyoxyethylene polymer which can be used is available from Union Carbide under the trade designation POLYOX resins designated as WSR-1105 having a molecular weight of 900,000 or WSR-205 having a molecular weight of 600,000 or the WSRN-3,000 having a molecular weight of 400,000. The solution viscosity can be determined at 25° C. with a No. 1 spindle at 50 rpm. The POLYOX material is a water soluble resin which is nonionic and thermoplastic and it has a common structure of: $(-O-CH_2CH_2)-_n$ where the degree of polymerization, n, varies from about 2,000 to about 100,000. With the repeating unit having a molecular weight of 44, the polymer has a corresponding molecular weight in the range of about 100,000 to about 5,000,000 Mn. These materials are solids at room temperature, and they can have either a broad or narrow distribution of molecular weights. Their appearance is a white powder with a particle size as percent by weight through a No. 20 USBS sieve of 98 minimum, and they have: a melting point (crystal x-ray) of 65° C.; a volatiles content, as supplied by percent by weight of less than 1; an alkaline earth metals percent by weight of calcium oxide of 0.5; a powder bulk density of 24 pounds per cubic feet (117.2 kg/m$^2$); and a solution pH of 7–10. The amount of the polyoxyethylene polymer present in the aqueous chemical treating composition for treating the glass fibers of the present invention is an amount greater than around 30 weight percent solids of the aqueous chemical treating composition and preferably in an amount which is the predominant amount of the solids. The upper limit of the amount in the aqueous chemical treating composition is that amount which does not increase the viscosity above around 150 centipoise at 25° C. In addition, the polyoxyethylene polymer can be a polyoxyethylene homopolymer or can have very minor amounts of polyoxypropylene repeating units. The polyoxyethylene polymer can be dispersed in water by any method known to those skilled in the art.

Also poly(vinyl alcohol) can be present in the aqueous chemical treating composition with the polyoxyethylene of any of the aforementioned molecular weights. The amount of the poly(vinyl alcohol) present is an effective film forming amount with or without consideration of the amount of polyoxyethylene that is present.

In addition, the aqueous chemical treating composition has present one or more aldehyde-condensate-reactable polymeric agents. These polymeric agents are those that are capable of interaction bonding with the aldehyde-condensate-reactable coupling agent and the aldehyde-condensate resinous material used as the paper binder. Typical paper binders are urea formaldehyde, melamine formaldehyde, phenol formaldehyde, epichlorohydrin and amino resins and anionic or cationic modified versions thereof and mixtures of the various resins. These resinous materials have some unreacted formaldehyde or aldehyde donor or methylene donor like paraformaldehyde hexamethylene tetramine and the like and methylol groups like N-methylol groups in urea formaldehyde. The aldehyde-condensate-reactable polymeric agent is capable of reacting with the excess aldehyde or methylene donor or formaldehyde and the methylol groups. These reactions are those such as formation of methylene linkages or methylene and ether linkages through bimolecular reactions and/or methyleneurea formation and polymerization reactions.

Nonexclusive examples of these polymeric agents include: polyacrylamide and/or polyamide where the former is capable of covalently reacting with the urea formaldehyde while the latter is capable of hydrogen bond reactions with the urea formaldehyde. Which of the aldehyde-condensate-reactable agents is used depends not only on the interaction bonding capability with the aldehyde-condensate resinous material of the paper binder but also depends on the composition of the white water system in which the glass fibers are to be dispersed. If the white water system has an incompatible amount of polyacrylamide, then the polyamide is used as the aldehyde-condensate, or more particularly, the urea formaldehyde, reactable polymeric agent. If the white water system is devoid of any polyacrylamide, then the polyacrylamide and/or polyamide can be is used in the aqueous chemical treating composition as the reactable polymeric agent. If the white water system has polyamide present, then the polyacrylamide and/or polyamides can be used in the aqueous chemical treating composition. The polyacrylamide is a stronger reacting polymeric agent for aldehyde condensates like urea formaldehyde than is the polyamide. Hence, higher quantities of the polyamide are tolerated by the white water system compared to quantities of the polyacrylamide. The total amount of polyacrylamide in a white water system combining the amount present on the glass fibers and the amount used as a suspending agent in the white water should not exceed around 20 weight percent of the solids of the aqueous chemical treating composition.

Nonexclusive examples of the polyacrylamide that can be used in the aqueous chemical treating composition are those polyacrylamides having the structure $(-CH_2CHCONH_2)$. The polyacrylamides can range from anionic to cationic. The polyacrylamide should be water soluble, dispersible or emulsifiable and ordinarily, polyacrylamide is rapidly wetted by water and can be dissolved in all proportions. Higher solution concentrations of the polyacrylamides can increase the viscosity of the aqueous chemical treating composition to too high a level. A nonexclusive example of the polyacrylamide is that available from Dow Chemical Company under the trade designation Strength Resin 87D which is slightly anionic and has a molecular weight of 500,000. A nonexclusive example of a polyamide resin which can be used in the aqueous chemical treating composition is that available from Georgia Pacific Company, Resin Division, Atlanta, Ga. under the trade designation GP2925. This polyamide is an amber colored liquid having a percent solids of 20 to 20.5, a viscosity in centistokes of 140 to 200, a specific gravity of 1.04 to 1.05, a weight per gallon in pounds of 8.7, a pH at 25° C. of 6.9 to 7.3, a boiling point of 100° C., a flash point of none to boiling and a storage life at 25° C. of six months. In addition, the polyamide resin may contain a trace of free epichlorohydrin.

The amount of the polyacrylamide is preferably around 2 to about 10 and most preferably about 4 to about 8 weight percent of the solids of the aqueous chemical treating composition for white water systems containing little or no polyacrylamide resins. For white water systems already containing the higher amounts of polyacrylamide resin, the reactable polymeric agent is the polyamide in amounts in the aqueous chemical treating composition that range from about 1 to about 50 weight percent of the solids of the aqueous chemical treating composition. Higher amounts of the polyamides appear to have a detrimental effect on tensile strengths of the glass fiber paper product. Any method known to those skilled in the art for placing, dispersing or emulsifying the polyamide resin or polyacrylamide resin in aqueous solutions can be used.

The aqueous chemical treating composition also has present an aldehyde-condensate-reactable organo silane coupling agent such as alkoxylated gamma aminoalkyl-trialkoxy silane, polyamino organo silanes, mercapto functional organo silanes and ureido-functional organo silanes. These organo silane coupling agents can be in unhydrolyzed or hydrolyzed form, silanol form or in the siloxane polymeric form. The organo moiety of these organo functional silane coupling agents is a difunctional organic radical selected from the lower alkyl or aliphatic hydrocarbons having less than 8 carbon atoms. The organic group bonded with the oxygen in the organo functional silane coupling agent can be the same or different organic moieties selected from lower alkyl or aliphatic hydrocarbons having less than 8 and preferably less than 5 carbon atoms. Nonexclusive examples of the urea formaldehyde-reactable organo silane coupling agent include: the gamma aminopropyl-triethoxy silane, ethoxylated gamma aminopropyltriethoxy silane such as that available commercially from Union Carbide Corporation under the trade designation A-1108, the polyamino organo functional silane coupling agent such as N-beta(aminoethyl) gamma aminopropyltrimethoxy silane (A-1120), the material available from Union Carbide (A-1130), which is a polyamino organo silane coupling agent and the ureido silane having the structure $H_2NCONHC_3H_6Si(OC_2H_5)_3$, 50 percent in methanol, available under the trade designation A-1160. The presence of other types of organo silane coupling agents is not needed, since one or more of the aldehyde-condensate-reactable organo functional silane coupling agents give adequate performance. The addition of further different types of organo silane coupling agents provide little extra benefit. The amount of the aldehyde-condensate-reactable organo silane coupling agent present in the aqueous chemical treating composition depends upon the type of aldehyde-condensate-reactable, polymeric agent. When the reactable polymeric agent is polyacrylamide, the aqueous chemical treating composition can have lower amounts of the aldehyde-condensate-reactable organo silane coupling agent. On the other hand, when the reactable, polymeric reacting agent is polyamide, the aqueous chemical treating composition has a higher amount of the aldehyde-condensate-reactable organo silane coupling agent. Also, mixtures of the aldehyde-condensate-reactable silane coupling agents can be used. With the polyacrylamide present in the aqueous chemical treating composition, the amount of the organo silane coupling agent can be up to around 25 weight percent of the solids of the aqueous chemical treating composition. When the polyamide is present in the aqueous chemical treating composition, the organo silane coupling agent can be present in an amount up to around 50 weight percent of the solids of the aqueous chemical treating composition.

The treating composition of the present invention has one or more water soluble, dispersible or emulsifiable cationic lubricant surfactants having one or more primary, secondary and/or tertiary amine moieties. Nonexclusive examples of the cationic lubricating surfactants include: aliphatic mono, di, and polyamines like N-alkyl trimethylenediamine, 2-alkyl-2-imidazoline or 1-(2-aminoethyl)-2-alkyl-2-imidazoline, where, respectively, the alkyl groups can be those such as soya alkyl, tallow alkyl, coco alkyl or 9-octa-decyl or mixtures of alkyls, heptadecenyl, undecyl or heptadecyl, nonyl or mixtures of alkyls, where these compounds are water soluble, dispersible or emulsifiable. Also compounds can be used that are like: amine oxides, polyoxyalkylene alkylamines, 1-(2-hydroxyalkyl)-2-alkyl-2-imidazolines, 2-hydroxylalkyl-2-imidazoline, or N,N,N',-tetrakis-substituted alkylene diamine derivatives or rosin derived amines, where the alkyl groups can be like cetyl, lauryl, myristyl, stearyl, coco, hydrogenated tallow, hexadecyl, tallow octadecyl, alkyl groups for polyoxyalkylene, aliphatic and resin monoamines, where the alkylene is ethylene or an equivalent alkyl groups with from about 8 to about 22 carbon atoms, soybean oil and soya. Other useful cationic surfactants include polyoxyethylene alkyl and alicyclic amines, where any of the aforelisted alkyl groups and any of the known alicyclic groups can be used. These cationic materials are more fully described in the "Encyclopedia of Chemical Technology", Kirk and Othmer, Vol. 19, pages 554–563, The Interscience Encyclopedia, Inc., N.Y. These cationic materials include those like polyoxyethylene linear alkyl amines, and polyoxyethylene dihydroabietyl amines. Also useful are the condensation reaction products of carboxylic acids, fatty acids with di or polyamines or dialkylene or polyalkylene amines and polyalkoxylated derivatives thereof.

A particularly useful class of cationic surfactants are the lubricant cationic surfactants that are alkyl imidazoline derivatives, which includes compounds of the class, n-alkyl-N-amido-alkyl imidazolines, which may be formed by causing fatty acids or carboxylic acids to react with polyalkylene polyamines under conditions which produce ring closure. The reaction of tetraethylene pentamine with stearic acid is exemplary of such a reaction. These imidazolines are described more fully in U.S. Pat. No. 2,200,815 and other imidazolines are described in U.S. Pat. Nos. 2,267,965; 2,268,273; and 2,353,837. The most useful cationic lubricating surfactant is that available under the brandname Cation-X softener from Lyndal Chemical Co., Lyndhurst, N.J.

The amount of the cationic surfactant in the treating composition is in the range of about 5 to about 30 weight percent of the solids of the aqueous treating composition. The amount of the cationic surfactant will vary in this range depending on the number and type of cationic groups present in the cationic surfactant. Preferably the amount of cationic lubricating surfactant is in the range of about 10 to about 20 weight percent of the solids of the composition.

In addition to the foregoing chemical compounds, the treating composition of the present invention may have any of the chemical compounds, which are known to be useful in aqueous treating compositions for treating glass fibers to be dispersed in aqueous media. Nonexclusive examples include additional film forming polymers, lubricants, antioxidants, bactericides and the like. Preferably, starches and nonpolymeric amide compounds that are water soluble or dispersible such as urea or monoamides, diamides, amine-containing amides, carbamide and derivatives, where the amide and amine groups are primary or secondary or mixtures thereof are not used in the present invention. The addition of these compounds to the composition does not serve any additional function or contribute any additional benefit for the composition.

Also present in the treating composition of the present invention is a liquid carrier, which is preferably water to make the treating composition an aqueous treating composition. The amount of water present in the aqueous treating composition is that amount necessary to give the treating composition a total solids content within a level, whereby the viscosity of the aqueous treating composition is effective for application to glass filaments, that is, a composition with a viscosity of around 0.6 to about 150 centipoise at 60° C. or less, although higher viscosities are possible with proper pumping equipment. Particularly, the amount of water present in the aqueous treating composition is sufficient to give a total solids (nonaqueous) content of the aqueous treating composition in the range of about 1 to about 25 percent by weight and preferably about 2 to about 10 percent by weight of the aqueous treating composition.

The treating composition of the present invention can be prepared by any method and with any equipment known to those skilled in the art for preparing aqueous treating compositions to be applied to glass fibers. For instance, the chemical compounds can be added sequentially or simultaneously to water or in any order whatsoever.

The aqueous treating composition can be applied to any of the glass fibers by any method known to those skilled in the art. For instance, the glass fibers can be prepared by mechanical attenuation or the like from batch compositions known as "E" glass or "621" glass or any more environmentally acceptable derivatives thereof, and other types of glasses such as "A" glass, "C" glass, or "S" glass via direct or indirect melting operations. In preparing the glass fiber strand, the filament diameter of the glass fibers making up the strands can vary from around 3 microns to around 20 microns or higher and preferably around 9 to around 18 microns. The aqueous treating composition can be applied to the glass fibers after they are formed and during their attenuation by any type of applicator such as belt applicators, roll applicators or any applicator which enables the liquid to contact the glass fibers. The amount of the aqueous treating composition applied to the glass fibers should be sufficient to give at least a partial or intermittent coating of the treating composition on the treated glass fiber strand or around 0.01 to about 5 weight percent of the treated glass fiber strand. The treated glass fibers can be chopped directly as fibers or gathered into one or more glass fiber strands and chopped, where the fibers or strands are chopped during the process of forming the glass fibers after the treating composition has been applied to them. The chopped lengths vary from about 1/16 (1.59 mm) of an inch to about 3 inches (76.2 mm) and more particularly about ½ inch (12.7 mm) to about 1 inches (25.4 mm). Such a process is commonly referred to in the art as the wet chop process. The amount of the moisture on the wet-chopped glass fiber is usually in the range of up to about 20 weight percent of the treated fibers and preferably up to about 15 weight percent and most preferably between about 9 and about 15 weight percent. Also the glass fibers can be treated and gathered into strands much like the wet chop process, but the fibers are collected as continuous glass fiber strands into a forming package and subsequently chopped in a remote wet chop process or after drying in a dry chop process into lengths similar to those of the direct wet chop process.

The aqueous dispersion of the treated glass fibers is achieved merely by placing the wet or dry chopped glass fibers of the desired length into a batch of water with or without dispersing aids usually with agitation and/or turbulence to form a dispersion of glass fibers for use in the wet-laid process or other paper making processes. The amount of the chopped treated glass fibers in the aqueous dispersion can range from about 0.001 to about 5 but preferably about 0.01 to about 3 weight percent of the aqueous dispersion. Although the treated glass fibers of the present invention can be used without dispersion aids, any of the conventional dispersion aids can be used with the chopped, treated glass fibers of the present invention. Nonexclusive examples of such dispersion aids that can be used include the polyoxyethylated tallow amine dispersing agent available from GAF Corporation under the trade designation "Katapol" agents like VP 532 used alone or in conjunction with thickeners like hydroxy and/or carboxy alkyl cellulose, especially the hydroxy ethyl and hydroxy methyl celluloses and soluble or dispersible salts thereof such as that available from Hercules, Inc. under the trade designation "Natrasol" or other thickeners like "Separan AP273" polyamide from Dow Chemical Company and the like. Another example of a dispersing agent that can be used with the chopped glass fiber strands of the present invention is the dispersing agent available from Diamond-Shamrock Chemical Company under the trade designation "Nopcosperse" and especially the "Nopcosperse" FFD product. The Nopcosperse FFD product is a blend of alkyl sulfate quaternary of the alkyl amino fatty acid amide or amine in a water dispersible, mineral oil with an inorganic silica defoaming agent. Other examples of dispersing agents that can be used include the quaternary ammonium compounds such as those available under the trade designation "Arquad 2 HT-75" and the like. Also, quaternary ammonium surfactants can be used such as those available under Arquad and Aliquat trade designations and mixtures of amine oxides with derivatized guar gum and mixture of guar gum and isostearic amides can be used. Also amine oxide or polyacrylamide suspending agents can be used.

The nonwoven, sheet-like mat of treated chopped glass fibers can be made by any method and with any apparatus known to those skilled in the art. For example, a hand mold method and apparatus can be used or the Fourdrinier paper machine or cylinder machines can also be used. Also, the machines known as Stevens former of the Beloit Corporation and the Rotoformer from the Sandy Hill Corporation and the Inver former from the Beloit Corporation and the Vertiformer from the Black Clawson Company can all be used to form the mat of the present invention. In the wet-laid process, the aqueous dispersion of glass fibers may be diluted by white water and held in a head box of any of the aforementioned machines. The white water is water containing similar dispersing agents as the aqueous dispersion, where the white water is fresh and/or recirculated from collection points in the process of forming the nonwoven mat. The aqueous dispersion from the head box is placed on a screen or cylinder, where some water is removed usually by vacuum or suction apparatus. After sufficient water has been removed, the mat has a polymeric binder applied to it, and any excess binder is removed usually by vacuum or suction means. The binder-containing mat is dried and cured in one or more ovens to produce the nonwoven, sheet-like mat. The mat may be collected usually in a large roll weighing from several hundred pounds to close to 1,000 pounds (454 kg).

The polymeric binders that are used to produce the sheet-like mat are any of the group of so-called "wet strength" resins, which include resins such as aldehyde-condensate resins, like urea formaldehyde, and resins such as cationic polyamide epichlorohydrin commercially available from Hercules, Inc. under the trade name "Kymene 557 H", and cationic urea-formaldehyde resins available from Hercules, Inc. under the trade designations "Kymene 882" and "Kymene 917". Also, melamine-formaldehyde type resins and phenol formaldehyde type resins and resorcinol formaldehyde type resins and polymerizable polyfunctional N-methylol compounds, notably N-methylol ureas such as dimethylol urea and N-methylol melamine type resins and other amino resins known to those skilled in the art can be used. Other types of resins that can be used are polyvinyl alcohol, polyvinyl acetate, and acrylic polymers and copolymers. Also, mixtures of resins can be used such as the urea formaldehyde or melamine formaldehyde resins mixed with styrene butadiene copolymer latices and other latices and/or acrylic polymers or copolymers like acrylamide. The amount of binder used in the nonwoven, sheet-like mat product is in the range of about 3 to about 45 percent, preferably about 10 to about 30 percent based on the weight of the unfinished mat. If the amount of binder is too great, the porosity of the mat could be adversely affected, and, if the amount is too low, the integrity of the mat could be adversely affected. After the binder is applied, the binder-containing glass fiber mat is dried to set or cure the binder. This can be accomplished with can driers or any one or more drying devices used in the art.

The nonwoven, sheet-like glass fiber mat of the present invention is suitable for use as a replacement for felt in shingles and also for use in built-up roofing (BUR) systems and for use as backing materials and base materials in flooring applications. In these applications, the mat with the polymeric binder must have certain strength properties. These strength properties are measured by dry tensile, wet tensile, hot-wet tensile and tear strength of the mat with the polymeric binder. A good mat and binder product must have adequate tensile strength and adequate tear strength and wet strength. The nonwoven, sheet-like mat and binder product of the present invention has these adequate properties and even further improved values for some of these properties as is shown in the examples of the present invention.

PREFERRED EMBODIMENT OF THE INVENTION

The aqueous chemical treating composition preferably has one cationic lubricant surfactant which is the fatty imidazoline derivative formed as the reaction product of tetraethylene pentamine or mixtures containing the same and stearic acid, which also may have enough dextrin to prevent syneresis. Also the composition has the polyoxyethylene homopolymer with a molecular weight of around 900,000. Also present as the aldehyde-condensate-reactable, polymeric agent is the urea-formal-dehyde-reactable, polymeric agent which is preferably polyacrylamide for non-polyacrylamide containing white water systems and which is polyamide for polyacrylamide-containing white water systems. The nitrogen-containing organosilane coupling agent is preferably the ethoxylated gamma aminopropyltriethoxy silane for the non-acrylamide-containing white water systems.

For the non or low polyacrylamide containing white water systems, the glass fibers of the present invention preferably have an aqueous chemical treating composition prepared in the following manner. The polyoxyethylene homopolymer having a molecular weight of 900,000 is added to water which is rapidly stirred with around a 2 horsepower motor at 1800 rpm to make a solution which is less than 3 percent by weight of the polyethylene oxide homopolymer. The initial water temperature is around 65° to around 95° F., and most preferably around 75° to around 80° F. (23.9° C. to 26.7° C.) maximum and the polyoxyethylene homopolymer is added within around 5 minutes and about 30 minutes later, the temperature is raised to a temperature of around 115° F., but to a temperature less than that of boiling water until particles are no longer visible. Preferably, the elevated temperature is around 120° F. After dissolution of the polyoxyethylene homopolymer in water, the solution is transferred to a main mix tank. Water is added to a premix tank in a sufficient amount to solubilize the polyacrylamide resin, 87D which is added to the water and stirred for around 5 minutes and transferred to the main mix tank. Water is added to a premix tank and the ethoxylated gamma aminopropyltriethoxy silane is added and stirred for 5 minutes and transferred to a main mix tank. Hot deionized water is added to a main mix tank and the cationic lubricant (Cat-X) is added to the water dissolved and transferred to the main mix tank. The formulation for the preferred sizing composition is as follows: for a 5 gallon (18.9 liter) mix

| | |
|---|---|
| Water | 5,777 gms. |
| Polyethylene oxide 900,000 molecular weight | 154.2 gms. |
| Water | 500 gms. |
| Strength Resin 87D | 45.8 gms. |
| Water | 1,000 gms. |
| Ethoxylated gamma aminopropyltriethoxy silane | 51.3 gms. |
| Water | 500 gms. |
| Cationic lubricant (Cat-X) | 49.9 gms. |

The solids of the chemical treating composition is around 1.2 weight percent and the pH is around 9 and the average particle size is around 0.5 microns.

For the acrylamide containing white water system, the aqueous chemical treating composition preferably as in weight percent of the nonaqueous components the following formulation:

| | |
|---|---|
| Poly(ethylene oxide) homopolymer | 35 weight percent solids |
| Polyamide GP 2925 | 20 weight percent solids |
| Cationic lubricant (Cat-X) | 15 weight percent solids |
| Ureido functional silane | 30 weight percent solids |

This aqueous chemical treating composition is prepared similarly to the first aqueous chemical treating composition except the polyamide resin is substituted for the polyacrylamide strength resin 87D and the ureido functional silane is substituted for the ethoxylated gamma aminopropyltriethoxy silane.

The aqueous treating composition is used to treat the glass fibers preferably in a wet chop process, where the treated glass fibers are gathered into strands and chopped during the fiber formation and attenuation process. Preferably, the treated glass fibers are chopped into lengths ranging from ½ inch (12.7 mm) to a little over 1 inch (25.4 mm). The treated glass fiber strands have an amount of the treating composition ranging in an amount from about 0.01 to about 1.5 percent, most preferably 0.05 to about 0.1 weight percent of the treated glass fiber strands.

The treated glass fiber strands are added to water to form a dispersion and it is preferred that a dispersing agent such as Katapol VP532 dispersant in combination with the Natrasol HR 250 thickener be used in amounts in the range of about 0.001 to about 0.05 weight percent for each material based on the weight of the dispersion. The chopped glass fibers are added to the aqueous solution with the dispersing agents in a preferred amount of about 0.1 to 1.0 weight percent of the aqueous dispersion and, thereafter, diluted with white water to about 0.01 to about 0.05 weight percent of the aqueous dispersion. The preferred polymeric material used to form the nonwoven, sheet-like mat is a urea formaldehyde resin modified to have anionic functionality, either by a blend of polymers or by the presence of anionic groups placed on the urea formaldehyde resin. The mat is dried and cured in an oven after any excess binder is removed by vacuum or suction means to produce the nonwoven, sheet-like mat of the present invention.

Additional information and further illustrations of the embodiments of the aqueous treating composition, treated glass fibers, dispersion and nonwoven, sheet-like mat of the present invention are presented in the following examples, although these examples do not limit the scope of the invention to these specific embodiments.

Numerous examples of aqueous chemical treating compositions are given in Table 1 which were prepared in a method similar to that of the preferred embodiment.

The various aqueous chemical treating compositions of Table 1 were used to treat glass fibers which were subsequently chopped and prepared as hand sheets or tested on a mat line for making glass paper. The results of the testing the hand sheets are given in Table 2. The hand sheets were prepared and tested in accordance with the procedures described at columns 18–20 of U.S. Pat. No. 4,457,785 (Hsu et al.), which is hereby incorporated by reference.

TABLE 1

| Sizing Components | 1 Wt % Solids | 2 Wt % Solids | 3 Wt % Solids | 4 Wt % Solids | 5 Wt % Solids | 6 Wt % Solids | 7 Wt % Solids |
|---|---|---|---|---|---|---|---|
| Poly(ethylene) oxide homopolymer poly(oxyethylene-oxypropylene copolymer) (Tetronik 1508) | 66 | 68 | 65 | 62 | 78 | 45 | 45 |
| Urea formaldehyde reactable white water thickener compatible agent: | | | | | | | |
| Polyacrylamide 0–6 (87D) | 20 | 4 | 4 | 4 | 4 | — | — |
| Polyamide 0–25 GP-2925 | — | — | — | — | — | 25 | 25 |
| Starch | | | | | | | |
| Cationic imidazoline derivative lubricant (Cat-X) | 6 | 8 | 12 | 16 | 8 | 10 | 10 |
| Amino organosilane coupling agent: | | | | | | | |
| Ethoxylated aminoorganosilane A-1108 | 8 | 20 | 19 | 18 | 10 | — | — |
| Polyamino organo silane: | | | | | | | |
| A-1160 | — | — | — | — | — | 20 | 20 |
| A-1130 | — | — | — | — | — | — | — |
| Epoxy functional silane (A-187) | — | — | — | — | — | — | — |
| pH | — | 9.5 | 8.8 | 8.0 | 9.2 | — | — |
| Solids | 0.97 | 0.97 | 1.1 | 1.1 | 1 | 1.17 | 1.13 |

| Sizing Components | 8 Wt % Solids | 9 Wt % Solids | 10 Wt % Solids | 11 Wt % Solids | 12 Wt % Solids | 13 Wt % Solids | 14 Wt % Solids |
|---|---|---|---|---|---|---|---|
| Poly(ethylene) oxide homopolymer | 45 | 45 | 40 | 35 | 45 | 30 | 50 |
| Poly (oxyethylene-oxypropylene copolymer) (Tetronic 1508) | — | — | — | — | — | — | — |
| Urea formaldehyde reactable white water thickener compatible agent: | | | | | | | |
| Polyacrylamide (87D) | — | — | — | — | — | — | — |
| Polyamide GP-2925 | 25 | 25 | 15 | 20 | 10 | 15 | — |
| Starch | — | — | — | — | — | — | 15 |
| Cationic imidazoline derivative lubricant (Cat-X) | 10 | 10 | 15 | 15 | 15 | 15 | 15 |
| Ethoxylated aminoorganosilane A-1108 | 20 | — | — | — | — | — | — |
| Polyamino organo silane: | | | | | | | |
| A-1160 | — | — | 30 | 30 | 30 | 40 | 20 |

TABLE 1-continued

| Sizing Components | | | | | | | |
|---|---|---|---|---|---|---|---|
| A-1130 | — | 20 | — | — | — | — | — |
| Epoxy functional silane (A-187) | — | — | — | — | — | — | — |
| pH | — | — | — | 6.7 | 6.3 | 6.5 | 6.5 |
| Solids | 1.1 | 1.1 | 1.0 | 1.0 | 1.0 | 1.0 | 1.0 |

| Sizing Components | 15 Wt % Solids | 16 Wt % Solids | 17 Wt % Solids | 18 Wt % Solids | 19 Wt % Solids | Illustrative Example |
|---|---|---|---|---|---|---|
| Poly(ethylene) oxide homopolymer | 58 | 58 | 53 | 48 | 30 | — |
| Poly(oxyethylene-oxypropylene copolymer) (Tetronic 1508) | — | — | — | — | — | 64.9 |
| Urea formaldehyde reactable white water thickener compatible agent: | | | | | | |
| Polyacrylamide (87D) | 4 | 7 | 7 | 7 | — | — |
| Polyamide GP-2925 | — | — | 5 | 10 | 10 | — |
| Starch | — | — | — | — | — | 20 |
| Cationic imidazoline derivative lubricant (Cat-X) | 20 | 20 | 20 | 20 | 20 | 7.8 |
| Ethoxylated amino-organosilane A-1108 | 18 | 15 | 15 | 15 | — | — |
| Polyamino organo silane: | | | | | | |
| A-1160 | — | — | — | — | 40 | — |
| A-1130 | — | — | — | — | — | — |
| Epoxy functional organo-silane (A-187) | — | — | — | — | — | 7.2 |
| pH | 8.7 | 8.9 | 8.2 | 7.8 | 6.2 | 7.2 |
| Solids | 1.0 | 1.0 | 1.0 | 1.0 | 1.0 | — |

TABLE 2

Physical Properties of Chemically Treated Glass Fibers

| Physical Properties | Eg. 1 | Eg. 1 | Eg. 2 | Eg. 3 | Eg. 4 | Eg. 5 | Eg. 6 | Eg. 7 | Eg. 8 | Eg. 9 | Ill. Eg. 1 |
|---|---|---|---|---|---|---|---|---|---|---|---|
| LOI | 0.8 | 0.12 | 0.15 | 0.13 | 0.12 | 0.15 | 0.17 | 0.17 | 0.15 | 0.17 | .10 |
| Moisture | 10.8 | 13.1 | 13 | 13.5 | 13.9 | 15 | 12.6 | 11.8 | 10.7 | 12.5 | 12.0 |
| Dispersion | 7 | 6 | 6 | 5.5 | 7 | 6.5 | 6.0 | 6.0 | 6.0 | 4.0 | 8.0 |
| Mat Weight | 1.97 | 2.43 | — | 6.8 | 7.15 | 6.5 | 2.3 | 2.4 | 2.3 | 2.2 | 2.3 |
| Mat LOI | 15.8 | 24.7 | 22.5 | — | 7.15 | 21.5 | 29.2 | 28.4 | 27.4 | 25.5 | 29 |
| Tensile | 25.6 | 32 | 38.9 | 33.5 | 35.6 | 27.3 | 43 | 48 | 48.6 | 49.7 | 46.9 |
| Tear | 427 | 444 | 310 | 330 | 490 | 356 | 350 | 358 | 352 | 430 | 390 |

(1) The paper products of Examples 1, 3 and 4 were prepared using a white water system having Katapol and Separan Materials and using Type A urea formaldehyde paper binder.
(2) The paper products of Examples 2 and 5 were prepared using a white water system having amine oxide surfactant or dispersion, and a Type B urea formaldehyde paper binder.
(3) The paper products of Example 6–9 and Illustrative Example 1 were prepared using a white water system having Katapol and Separan materials and additional water conditioning agents and Type A urea formaldehyde paper binder.

Physical Properties of Chemically Treated Glass Fibers[4]

| Physical Properties | Eg. 11 | Eg. 12 | Eg. 13 | Eg. 14 | Eg. 15 | Eg. 16 | Eg. 17 | Eg. 18 | Eg. 19 | Ill. Eg. 2 |
|---|---|---|---|---|---|---|---|---|---|---|
| LOI | — | — | — | — | — | — | — | — | — | — |
| Dispersion White water[1]/ White water[3] | 6.0/5.0 | 6.0/5.0 | 5.0/5 | 6.0/5.0 | 6.0/4.5 | 6/5 | 6.5/4.5 | 6/5 | 6/5 | — |
| Mat Weight | | | | | | | | | | |
| White water[1] | 2.22 | 2.15 | 2.22 | 2.18 | 2.15 | 2.16 | 2.16 | 2.19 | 2.18 | 2.07 |
| White water[3] | 2.21 | 2.15 | 2.18 | 2.16 | 2.23 | 2.17 | 2.20 | 2.18 | 2.09 | 2.08 |
| Mat LOI | | | | | | | | | | |
| White water[1] | 23 | 23.9 | 25.5 | 24 | 23.6 | 23.7 | 22.8 | 25.2 | 23.6 | 21.9 |
| White water[3] | 19.8 | 21 | 20.2 | 21 | 22 | 20.7 | 20.9 | 22.3 | 19.5 | 19.3 |
| Tensile | | | | | | | | | | |
| White water[1] | 37.5 | 35.5 | 35.0 | 34.0 | 27.5 | 25.5 | 25.3 | 33 | 35.5 | 23.5 |
| White water[3] | 32.5 | 32.0 | 30.5 | 30.0 | 27.5 | 25.5 | 26 | 25 | 26.5 | 25.5 |
| Tear | | | | | | | | | | |
| White water[1] | 367 | 357 | 436 | 462 | 357 | 357 | 420 | 336 | 457 | 431 |
| White water[3] | 356 | 327 | 386 | 433 | 382 | 339 | 264 | 315 | 445 | 414 |

[1]White water system of footnote 1 of Table 2, page 31.
[3]White water system of footnote 3 of Table 2, page 31.
[4]All paper products were prepared using Type A urea formaldehyde paper binder.

In addition to the physical properties for paper produced from a slurry of glass fibers as indicated in Table 2, other glass fiber papers were produced. A similar hand-sheet method of producing glass fiber papers as used for those examples in Table 2 was used with a white water system having an amine oxide dispersant. The dispersion of the glass fibers, the tensile strength, wet strength retention and tear strength of the glass paper product are presented in Table 3. Also the percent size retained after two hours at either 100° F. or 75° F. is indicated. The glass paper products that were tested were those produced from Examples 1, 11, 14 and 19. The tensile strength and wet strength retention and tear strength of the paper produced form an Example 1 glass fibers are compared with the paper produced from the glass fibers of the Illustrative Example. The values given are the percentage change from those values obtained for the Illustrative Example paper product.

provide for a good percentage of size retained on the glass fibers in the process of making the glass paper.

Table 5 shows the improvement in integrity in the wet state when using the water soluble, ungelled polymer in a sizing formulation.

TABLE 3

Physical Properties of Paper Produced from Slurry of Glass Fibers

| Glass Fibers | White Water System | Tensile Strength | Percent Wet Strength Retention | Tear Strength | % Size Retained 2 hr/100° F./in Deionized H$_2$O |
|---|---|---|---|---|---|
| | | % Change From Ill. Eg. | | | |
| Example 1[1] | Amine oxide | 10 | 30 | 5 | — |
| Example 1[1] | Amine oxide | 11.13 | — | 12 | 41 |
| Ill. Eg. 1 | Amine oxide | — | — | — | 19 (75° F.) |
| Example 11[2] | — | — | — | — | 76 |
| Example 14[2] | — | — | — | — | 79 |
| Example 19[2] | — | — | — | — | 79 |

[1]The paper binder used was Type B urea formaldehyde resin.
[2]Deionized water as white water.

Another test of the physical properties of the paper produced from a slurry of glass fibers of the present invention were conducted on a continuous mat making machine such as a Sandy Hill machine. The glass paper produced was compared against paper produced from commercially available glass fibers manufactured for use in making glass paper. The white water system, the dispersion, the tensile strength in the machine direction as well as the cross-direction and the percent hot-wet retention along with mat weight and LOI and tear strength are given in Table 4.

In Table 5 the bulk density test measures a slip flow characteristic in relation to compaction of chopped glass fiber strands. Compaction comes into play in molding reinforced thermoplastic materials. Bulk density is measured by filling a test tube with a known volume of chopped glass fiber strands. The test tube is placed on a shaker, and the volume occupied by the strands after shaking is recorded. Higher volumes indicate better bulk density. The final flow test is conducted by placing a given quantity of chopped glass fiber strands either dry chopped or dried wet chopped in a

TABLE 4

Physical Properties of Paper Produced from a Slurry of Glass Fibers on a Continuous Mat Line[1]

| Glass Fibers | White Water System | Mat Wt/LOI | Dispersion of Glass Fibers | Tensile Strength lb-force MD + CD | Tear Strength gms (MD) MD + CD | Percent Hot-Wet Retention |
|---|---|---|---|---|---|---|
| Example 11 | Separan dispersant Katapol thickener | 1.9/23 | 6.5 | 188 | — | 69 |
| Example 11 | Separan dispersant Katapol thickener other water conditioning agents | — | 6.5 | 224 | 894 (500) | — |
| Example 19 | Separan dispersant Katapol thickener | 1.9/21.5 | 6.0 | 168 | — | 71 |
| Commercial Owens-Corning Fiberglas | Separan dispersant Katapol thickener | 1.89/22 | 7.0 | 183.5 | — | 68.5 |
| | Separan dispersant Katapol thickener and Water Conditioning Agents | — | 7.0 | 210 | 866 (521) | — |

[1]Type A urea formaldehyde resin was used as the paper binder.

From Tables 3 and 4 it is seen that good values of tensile strength and tear strength and hot-wet retention are obtained with the glass fibers of the present invention while the glass fibers of the present invention also funnel equipped for vibration. The time it takes the total weight of the strands to pass through the funnel is recorded. Lower times in this test indicate better flow which is the better result.

TABLE 5
IMPROVEMENT IN WET STATE STRAND INTEGRITY

| Components of Aqueous Chemical Treatment | A | B | C | D | E | F | G | H |
|---|---|---|---|---|---|---|---|---|
| | \% of Non-Aqueous Components | | | | | | | |
| glycidoxy propyltriethoxy silane (A-187) | 3.00 | 3.00 | 5.77 | 5.77 | 4.30 | 4.30 | 3.30 | 3.30 |
| lubricant-modified amino organosilane (A-1108) | 0.57 | 0.57 | 1.10 | 1.10 | 1.00 | 1.00 | 1.00 | 1.00 |
| epoxy resin dispersion (CMD35201) | 31.50 | 31.50 | 32.88 | 32.88 | 32.46 | 32.46 | 32.46 | 32.46 |
| silylated poly vinyl acetate emulsion (Resyn 1037) | 44.19 | 43.90 | 46.12 | 45.53 | 45.54 | 45.54 | 45.54 | 45.54 |
| nonionic surfactant (Triton CF10) | 1.39 | 1.39 | 1.39 | 1.39 | 1.00 | 0.70 | 1.00 | 0.70 |
| polyethylene emulsion (protolube HD) | 10.68 | 10.68 | 6.41 | 6.41 | 8.54 | 8.54 | 8.54 | 8.54 |
| parraffin was emulsion (77-18) | 5.87 | 5.87 | 3.53 | 3.53 | 4.46 | 4.46 | 4.46 | 4.46 |
| cationic lubricant (cirrasol 185A) | 2.8 | 2.8 | 2.8 | 2.8 | 2.7 | 2.7 | 3.7 | 3.7 |
| polyoxyethylene (Polyox 301) | — | — | — | — | — | 0.30 | — | 0.30 |
| cationic polyacrylamide resin dispersion (Separan CE 511) | — | 0.59 | — | 0.59 | — | — | — | — |
| viscosity (UL 30) | | | | | 2.9 | 7.0 | 3.0 | 8.0 |
| solids | | 19.7 | 1.2 | | 17.98 | 15.1 | 18.0 | 15.4 |
| pH | 5.0 | 1.5 | | 5.6 | 6.0 | 6.1 | 6.0 | |
| LOI on glass fibers dried at 250° F. ± 10° F. | 1.73 | 1.69 | 1.41 | 1.80 | 1.86 | 1.85 | 1.95 | 1.89 |
| PD104 filamentation test | 7/21 | 3/15 | 6/18 | 1/7 | 10/28 | 4/17 | 14/28 | 2/12 |
| funnel flow (sec/1 kg) | 2.7 | 2.3 | 3.2 | 2.8 | 3.4 | 1.9 | 3.3 | 2.2 |
| bulk density (pcf) | 32.0 | 40.0 | 32.0 | 36.0 | 35.0 | 41.0 | 30.0 | 40.0 |

The PD104 filamentation test of Table 5 is conducted in the following manner. A weighed portion of dried glass fibers and a weighed amount of crushed walnut shells are placed in a metal can and shaken on a paint shaker for 3 to 6 minutes. The walnut shells and intact glass fibers are separated from the resultant, if any, fuzz balls by passing through screens. The fuzz balls are weighed and a ratio of the fuzz weight to the starting glass fiber weight yield a percent filamentation at specified time (in minutes) of shaking.

The improvement in the PD104 filamentation test as indicated in Table 5 and the improvement in funnel flow and bulk density occur with the presence of the wet state strand integrity polymer being present in the aqueous chemical treating composition.

I claim:

1. Glass fibers having at least a partial coating of a chemical treating composition, comprising:
   a. water soluble, dispersible or emulsifiable polyoxyethylene polymer having an effective film forming molecular weight, in the range of about 100,000 to 5,000,000 present in an amount in the range of greater than about 30 weight percent of the solids of the chemical treating composition,
   b. water soluble, dispersible or emulsifiable aldehyde-condensate-reactable polymeric agents in an effective white-water compatible amount,
   c. aldehyde-condensate-reactable organo silane coupling agents, wherein the polymeric agent and the silane coupling agent that are both aldehyde-condensate-reactable are capable of interaction bonding with each other and with the aldehyde-condensate resinous material when in the presence of the resinous material,
   d. cationic lubricant,
   e. liquid carrier in an effective amount to apply the aqueous chemical treating composition to the glass fibers.

2. Glass fibers of claim 1, wherein the polyoxyethlene polymer has a molecular weight range of about 600,000 to about 900,000 weight average molecular weight and is present in the aqueous chemical treating composition in a predominant amount of the solids of the chemical treating composition.

3. Glass fibers of claim 1, wherein the polyoxyethylene polymer is a solid and is solubilized by:
   (1) adding the polyoxyethylene homopolymer solid to water at a temperature of about 65° to around 95° F. with rapid agitation in effective amounts of the homopolymer in water to produce a solution having less than 3 percent by weight of the polyoxyethylene polymer,
   (2) continue rapid stirring for about 5 to about 20 minutes, and
   (3) increase the temperature of the solution to about 120° F. (48.9° C.).

4. Glass fibers of claim 1, which have in the chemical treating composition polyvinyl alcohol present as an additional film forming polymer in an effective film forming amount with the polyoxyethylene polymer.

5. Glass fibers of claim 1 that have an LOI of the aqueous chemical treating composition present in an amount of about 0.01 to about 1.5 weight percent of the treated glass fiber strand.

6. Glass fibers of claim 1, chopped to have lengths in the range of about 1/16 inch to about 3 inches.

7. Glass fibers of claim 1, wherein in the composition the cationic lubricant is selected from alkyl imidazoline derivatives including compounds of the class n-alkyl-N-amidoalkyl imidazolines, which may be formed by causing fatty acids or carboxylic acids to react with polyalkylene polyamines under conditions that produce ring closure, and is present in an amount in the range of about 5 to about 30 weight percent of the solids of the aqueous chemical treating composition.

8. Glass fibers of claim 1, wherein the aldehyde-condensate-reactable organo silane coupling agent is selected from the group consisting of alkoxylated gamma aminoalkyltrialkoxy silane, polyamino organo silane, mercapto functional organo silane and ureido functional organo silane in unhydrolyzed or hydrolyzed form or silanol form or in the siloxane polymeric form and mixtures thereof.

9. Glass fibers of claim 1, wherein the carrier is water which is present in an effective amount to give a total solids for the aqueous chemical treating composition whereby the viscosity of the composition is effective for application of the composition to glass fibers and in a range of about 0.6 to about 50 centipoise at 60° C. or less.

10. Glass fibers of claim 1, wherein the aldehyde-condensate-reactable polymeric agent is polyamide capable of hydrogen bond reactions with urea formaldehyde present in an amount in the range of about 10 to about 25 weight percent of the solids of the aqueous chemical treating composition.

11. Glass fibers of claim 1, wherein the aldehyde-condensate-reactable polymeric agent is selected from the group consisting of polyacrylamide and mixtures of polyacrylamide and polyamide where the polyacrylamide is present in the aqueous chemical treating composition in an amount up to 20 weight percent of the solids and the amount of any polyamide aldehyde-condensate-reactable agent present is in the range of about 1 to about 50 weight percent of the solids of the chemical treating composition.

12. Glass fibers of claim 11, wherein polyacrylamide is present as an aldehyde-condensate-reactable agent and the amount of the aldehyde-condensate-reactable silane coupling agent is present in an amount up to about 25 weight percent of the solids of the aqeous chemical treating composition.

13. Glass fibers of claim 10, wherein the polyamide is present as the aldehyde-condensate-reactable agent and the amount of the aldehyde-condensate-reactable silane coupling agent present is up to about 50 weight percent of the solids of the aqueous chemical treating composition.

14. Glass fibers of claim 13, wherein the polyamide contains a trace of free epichlorohydrin.

15. Glass fibers of claim 11, wherein the polyacrylamide is anionic with a molecular weight of 500,000 and is present in an amount of around 2 to about 10 weight percent of the solids of the aqueous chemical treating composition.

16. Glass fibers treated during their formation with an aqueous chemical treating composition, comprising:
(a) water soluble, dispersible or emulsifiable polyoxyethylene polymer having an effective film forming molecular weight in the range of about 600,000 to 4,000,000 present in a predominant amount of the solids of the aqueous chemical treating composition,
(b) water soluble, dispersible or emulsifiable urea formaldehyde reactable polymeric agents selected from the group consisting of polyacrylamide present in an amount of about 4 to about 8 weight percent of the solids of the aqueous chemical treating composition, polyamide present in an amount of about 10 to about 25 weight percent of the solids of the aqueous chemical treating composition and mixtures thereof wherein the polyamide is present in an amount of 1 to about 50 weight percent of the solids of the aqueous chemical treating composition,
(c) imidazoline-containing cationic lubricant present in an amount of about 5 to about 30 weight percent of the solids of the aqueous chemical treating composition,
(d) urea formaldehyde reactable organo silane coupling agents selected from the group consisting of gamma aminoalkyltrialkoxy silane, polyamino organo silane, ureido functional organo silane, mercapto organo functional silane present in an amount of up to 25 weight percent of the solids of the aqueous chemical treating composition when the urea formaldehyde reacting agent is polyacrylamide or a mixture of polyacrylamide and polyamide, and in an amount up to about 50 weight percent of the solids when the urea formaldehyde reacting agent is polyamide,
(e) water in an amount to give a total solids for the aqueous chemical treating composition in the range of about 1 to about 25 weight percent.

17. Glass fibers of claim 16, wherein the polyoxyethylene polymer is a solid and is solubilized by:
(1) adding the polyoxyethylene homopolymer solid to water at a temperature of about 75° to 80° F. (23.9° C. to 27° C.) with rapid agitation in effective amounts of the homopolymer in water to produce a solution having less than 3 percent by weight of the polyoxyethylene polymer,
(2) continue rapid stirring for about 30 minutes, and
(3) increase the temperature of the solution to about 120° F. (48.9° C.).

18. Glass fibers of claim 16, wherein the amount of the cationic lubricant present is in the range of about 10 to about 20 weight percent of the solids of the aqueous chemical treating composition.

19. Glass fibers of claim 16 that have an LOI of the aqueous chemical treating composition present in an amount of about 0.01 to about 1.5 weight percent of the treated glass fiber strands.

* * * * *

UNITED STATES PATENT AND TRADEMARK OFFICE
CERTIFICATE OF CORRECTION

PATENT NO. : 4,810,576

DATED : March 7, 1989

INVENTOR(S) : Peter C. Gaa et al

It is certified that error appears in the above-identified patent and that said Letters Patent is hereby corrected as shown below:

The following references should be cited in this patent:

| U.S. References | Dated | Inventor(s) |
|---|---|---|
| 4,397,913 | 8/9/83 | Fahey |
| 4,390,647 | 6/28/83 | Girgis |
| 4,295,871 | 10/20/81 | Droux et al |
| 4,052,257 | 10/4/77 | Hill et al |
| 4,361,465 | 11/30/82 | Graham |
| 4,284,538 | 8/18/81 | Graham |
| 3,864,155 | 2/4/75 | Graham |
| 4,178,204 | 12/11/79 | Chakrabarti |
| 4,258,098 | 3/24/81 | Bondoc et al |

| Foreign References | Dated | Country |
|---|---|---|
| 1,321,847 | 2/11/63 | France |
| 55-3313 | 1/11/80 | Japan |

Articles

"GP 2925 Glass and Mineral Fiber Sizing Agent" Technical Brochure.

UNITED STATES PATENT AND TRADEMARK OFFICE
CERTIFICATE OF CORRECTION

PATENT NO. : 4,810,576

DATED : March 7, 1989

INVENTOR(S) : Peter C. Gaa et al

It is certified that error appears in the above-identified patent and that said Letters Patent is hereby corrected as shown below:

Column 23, line 17, before the numeral "20" insert the term --around--.

Signed and Sealed this

Second Day of April, 1991

Attest:

HARRY F. MANBECK, JR.

*Attesting Officer*  *Commissioner of Patents and Trademarks*